US012761501B2

(12) United States Patent
Chen et al.

(10) Patent No.: US 12,761,501 B2
(45) Date of Patent: Oct. 13, 2026

(54) CONTACT LENS

(71) Applicant: Unicon Optical Co., LTD., Hsinchu City (TW)

(72) Inventors: Chih-Cheng Chen, Hsinchu County (TW); Hsien Sheng Liao, Hsinchu County (TW); Wen Chi Yang, Taichung City (TW)

(73) Assignee: UNICON OPTICAL CO., LTD., Hsinchu County (TW)

(*) Notice: Subject to any disclaimer, the term of this patent is extended or adjusted under 35 U.S.C. 154(b) by 423 days.

(21) Appl. No.: 18/469,930

(22) Filed: Sep. 19, 2023

(65) Prior Publication Data

US 2024/0111178 A1 Apr. 4, 2024

(30) Foreign Application Priority Data

Sep. 29, 2022 (TW) ................................ 111210642

(51) Int. Cl.
*G02C 7/04* (2006.01)

(52) U.S. Cl.
CPC .................................... *G02C 7/048* (2013.01)

(58) Field of Classification Search
CPC .......... G02C 7/048; G02C 7/04; G02C 7/049; G02C 7/044
See application file for complete search history.

(56) References Cited

U.S. PATENT DOCUMENTS

| | | | | |
|---|---|---|---|---|
| 5,020,898 | A | 6/1991 | Townsley | |
| 8,985,764 | B2 | 3/2015 | Yamaguchi et al. | |
| 9,383,592 | B2 * | 7/2016 | Menezes ................ | G02C 7/048 |
| 2020/0264449 | A1 * | 8/2020 | Chen ...................... | G02C 7/048 |

* cited by examiner

*Primary Examiner* — Bumsuk Won
*Assistant Examiner* — Ray Alexander Dean
(74) *Attorney, Agent, or Firm* — MUNCY, GEISSLER, OLDS & LOWE, P.C.

(57) ABSTRACT

A contact lens comprises an optical zone and a peripheral zone. The optical zone is used for vision correction. The peripheral zone surrounds the optical zone. The optical zone and the peripheral zone jointly define a geometric center and a horizontal axis passing through the geometric center. Two stabilization zones symmetrically arranged relative to the geometric center are formed in the peripheral zone. These stabilization zones gradually thicken relative to a base curved surface of the peripheral zone.

11 Claims, 5 Drawing Sheets

CONTACT LENS

FIELD OF THE INVENTION

The present invention relates to a contact lens, particularly to an optical structure of a contact lens.

BACKGROUND OF THE INVENTION

Contact lenses may be used for correcting visual defects such as myopia, hyperopia, astigmatism and presbyopia. Contact lenses for astigmatism correction, such as cylindrical lenses, bifocal lenses or multifocal lenses, correct vision by virtue of aspheric characteristics.

As far as the contact lens for astigmatism correction is concerned, the contact lens needs to be located in a special orientation relative to an eyeball and is fixed for a long time to effectively perform correction. When the contact lens worn by a wearer rotates and deviates as a result of blinking, rotating or moving, the wearer will have a blurred vision, so that the correction performance is poor. Known stable structures for a contact lens may be seen in U.S. Pat. Nos. 8,985,764B2, 5,020,898A, 9,383,592B2 and the like.

However, it is necessary to improve the existing stable structure of the contact lens which may have the problem of rotation and deviation when being worn.

SUMMARY OF THE INVENTION

The main objective of the present invention is to improve a stable structure for a contact lens.

To achieve the objective, the present invention provides a contact lens including an optical zone for vision correction, and a peripheral zone surrounding the optical zone. The optical zone and the peripheral zone jointly define a geometric center and a horizontal axis passing through the geometric center. Two stabilization zones symmetrically arranged relative to the geometric center are formed in the peripheral zone. The stabilization zones gradually thicken relative to a base curved surface of the peripheral zone and meet the following conditions. Each of the stabilization zones includes a first elevation starting boundary and a highest elevation zone in a radial direction relative to the geometric center. A distance from the first elevation starting boundary to the geometric center is between 2.5 mm and 3.5 mm A distance from the highest elevation zone to the geometric center is between 5.5 mm and 6.25 mm Each of the stabilization zones includes an upper portion extending upwards along a circumferential direction from the horizontal axis and a lower portion extending downwards along the circumferential direction from the horizontal axis. A second elevation starting boundary is defined between the upper portion and the peripheral zone. A third elevation starting boundary is defined between the lower portion and the peripheral zone. The second elevation starting boundary is located at an angle between +55° and +75° measured from the horizontal axis. The third elevation starting boundary is located at an angle between −55° and −75° measured from the horizontal axis. A height difference between the highest elevation zone of the stabilization zone in a thickness direction and the base curved surface of the peripheral zone is between 0.15 mm and 0.35 mm.

To achieve the objective, the present invention further provides a contact lens including an optical zone for vision correction and a peripheral zone surrounding the optical zone. The optical zone and the peripheral zone jointly define a geometric center and a horizontal axis passing through the geometric center. Two stabilization zones symmetrically arranged relative to the geometric center are formed in the peripheral zone. The stabilization zones gradually thicken relative to a base curved surface of the peripheral zone and meet the following conditions. Each of the stabilization zones includes a first elevation starting boundary and a highest elevation zone in a radial direction relative to the geometric center. A distance from the first elevation starting boundary to the geometric center is between 2.5 mm and 3.5 mm A distance from the highest elevation zone to the geometric center is between 5.5 mm and 6.25 mm Each of the stabilization zones further includes a fourth elevation starting boundary relative to the first elevation starting boundary. A first slope of a thickness variation of the stabilization zone from the first elevation starting boundary to the highest elevation zone is smaller than 0.2. A second slope of a thickness variation of the stabilization zone from the fourth elevation starting boundary to the highest elevation zone is greater than 0.6. Each of the stabilization zones includes an upper portion extending upwards along a circumferential direction from the horizontal axis and a lower portion extending downwards along the circumferential direction from the horizontal axis. The upper portion and the lower portion are mutually symmetrical relative to the horizontal axis. A height difference between the highest elevation zone of the stabilization zone in a thickness direction and the base curved surface of the peripheral zone is between 0.15 mm and 0.35 mm.

DETAILED DESCRIPTION OF THE PREFERRED EMBODIMENTS

Figure 1:
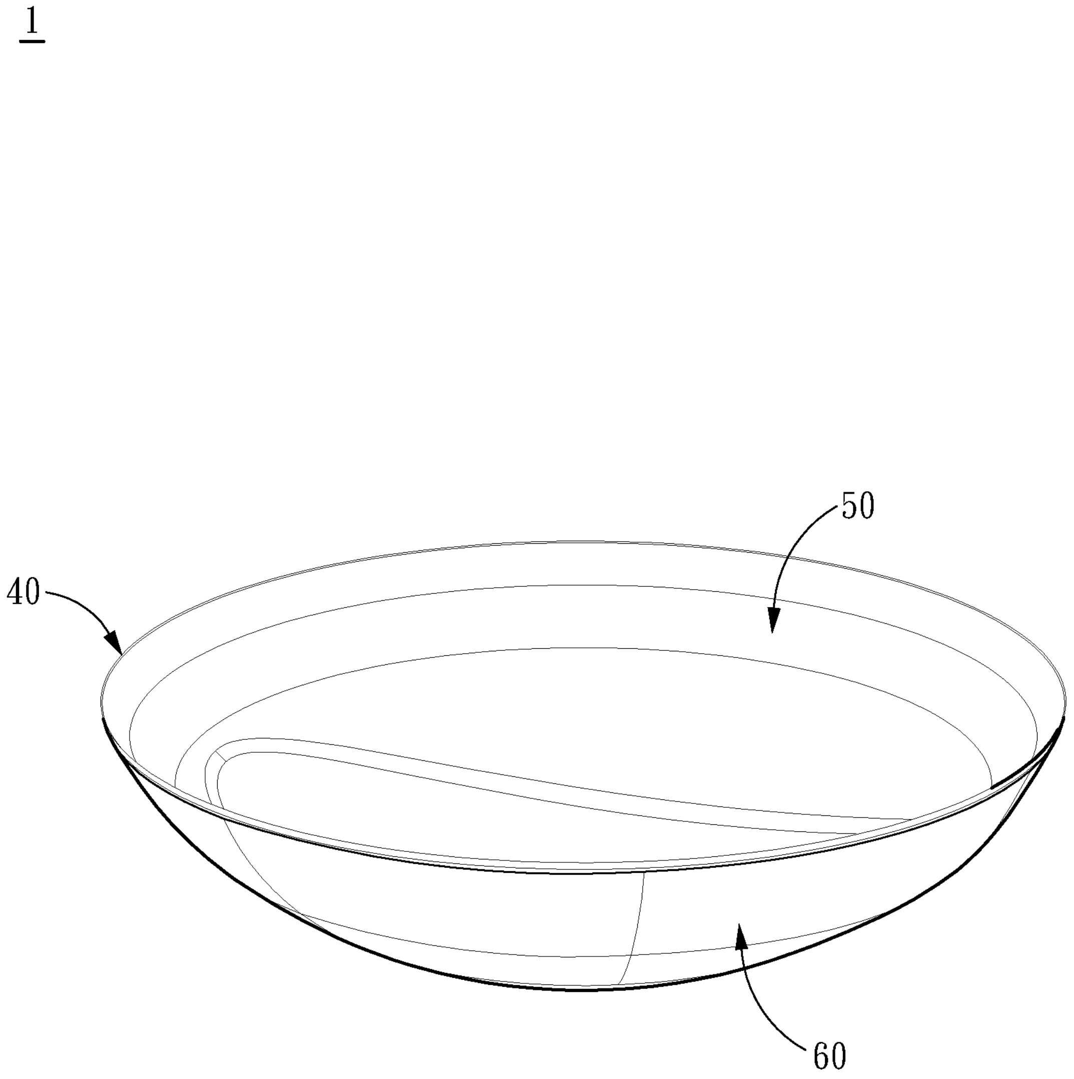
FIG. 1 is a schematic three-dimensional diagram of a contact lens of the present invention.
Figure 2:
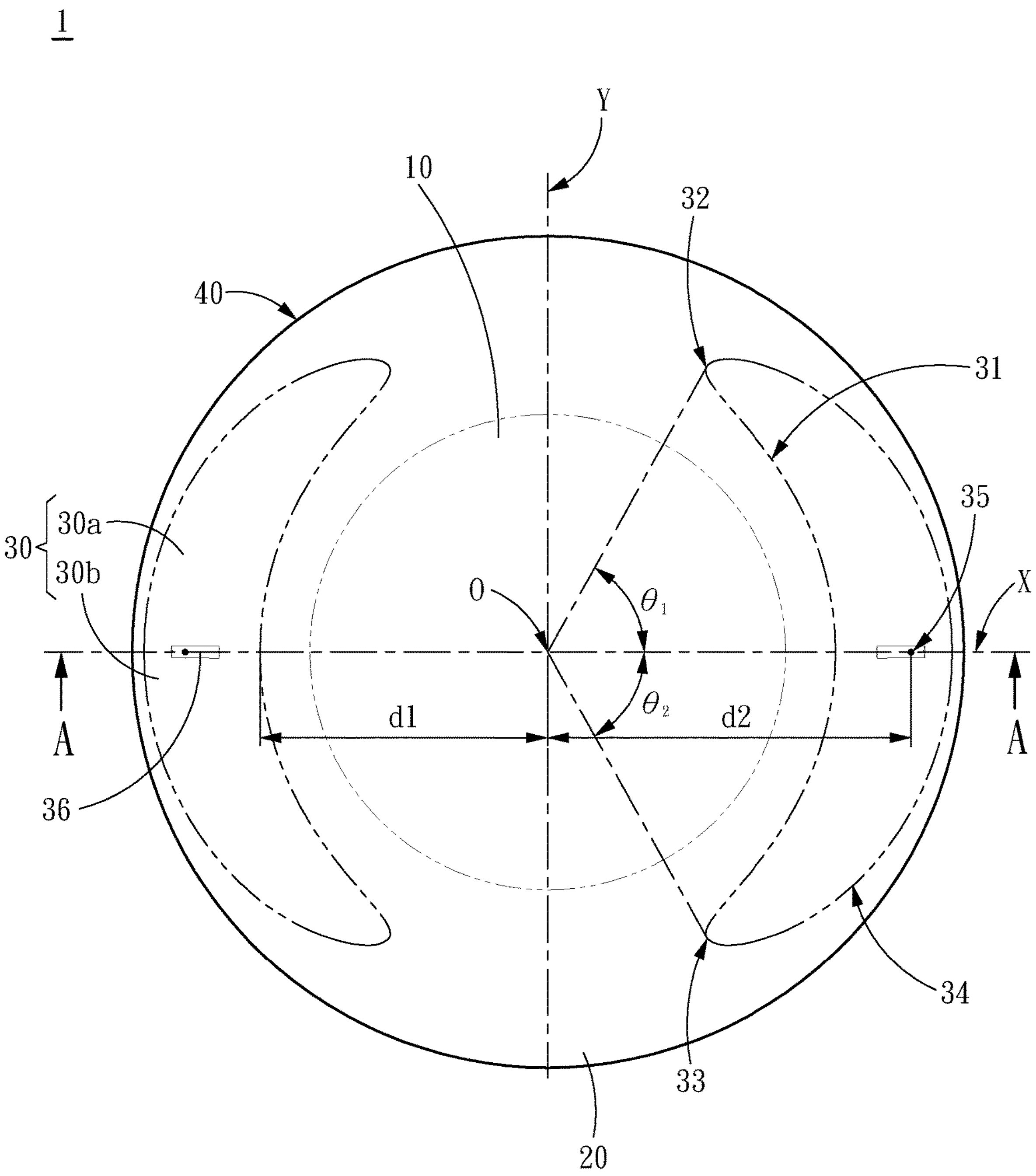
FIG. 2 is a schematic front view of a contact lens of the present invention.
Figure 3:
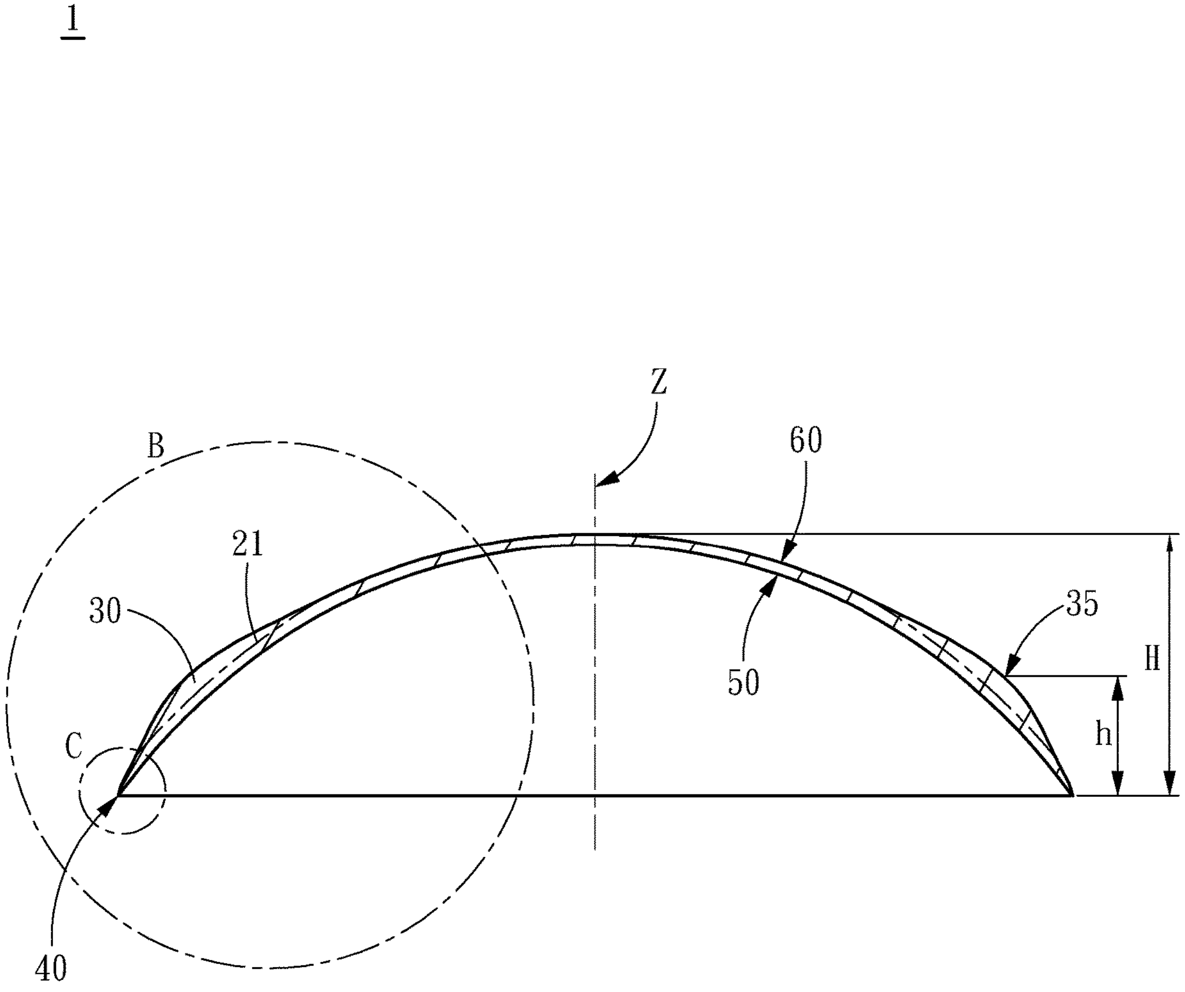
FIG. 3 is a schematic cross-sectional view taken along A-A of FIG. 2.

Terms used herein are merely based on the objective of describing specific embodiments and are not intended to limit the present invention. As used herein, the singular forms “a”, “an”, and “the” include the plural forms as well, unless the context clearly indicates otherwise. Detailed description and technical content relative to the present invention will be described below in combination with drawings:

Referring to FIG. 1 to FIG. 3, the present invention discloses a contact lens 1, including an optical zone 10, a peripheral zone 20, two stabilization zone 30 and an edge zone 40. The contact lens 1 has a concave side 50 and a convex side 60. The optical zone 10, the peripheral zone 20, the stabilization zones 30 and the edge zone 40 are of a continuous structure without a joint. Accordingly, foreign body sensation of the wearer wearing the contact lens may be reduced. The stabilization zone 30 is formed on the convex side 60 in a protruding manner relative to the peripheral zone 20. The concave side 50 contacts and matches an eyeball of a wearer, and the convex side 60 contacts the eyelids of the wearer when the wearer closes the eye. Accordingly, in a process during which the wearer blinks, the upper eyelid and the lower eyelid will press the stabilization zones 30 to maintain the contact lens in a fixed location, thereby achieving a fast positioning function.

In a preferred embodiment, a diameter of the contact lens 1 is between 13 mm and 15 mm. A base curve of the contact lens 1 ranges from 8 mm to 10 mm A center thickness of the contact lens 1 is between 0.05 mm and 0.3 mm. The contact lens 1 based on a selected material has a water content between 35% and 70%. For example, the material of the contact lens may be a hydrogel, a silicone hydrogel or a combination thereof. The myopic/hyperopic degree capable of being corrected by the contact lens 1 is between −15.00 D and +6.00 D (1500 degrees of myopia to 600 degrees of hyperopia). The astigmatic degree capable of being corrected by the contact lens 1 is between −0.50 D and −4.00 D (50 degrees to 400 degrees). The astigmatic axis degree capable of being corrected by the contact lens 1 is between 10 degrees to 180 degrees.

The optical zone 10 is located in the center of the contact lens 1 for vision connection such as myopia, hyperopia, astigmatism and presbyopia. The optical zone 10 may be, but is not limited to, a spherical surface, an aspheric surface or a double curved surface, and may be designed according to actual requirements of wears. In a preferred embodiment, an effective diameter of the optical zone 10 is greater than 5 mm A portion of the optical zone 10 located on the concave side 50 is attached to the eyeball of the wearer and may be designed to be elliptical, thereby correcting cylindrical deformation of the eyeball of the wearer. A portion of the optical zone 10 located on the convex side 60 contacts air and may be designed to be spherical or aspheric, which is not limited herein.

When viewed from FIG. 2, the optical zone 10 and the peripheral zone 20 jointly define a geometric center O, a horizontal axis X and a vertical axis Y, and the horizontal axis X and the vertical axis Y pass through the geometric center O and intersect at the geometric center O. The peripheral zone 20 surrounds the optical zone 10 and the stabilization zones 30, and the peripheral zone 20 includes a base curved surface 21.

The stabilization zones 30 symmetrically arranged relative to the geometric center O are formed on the convex side 60. Further, the stabilization zones 30 are symmetrically arranged relative to the vertical axis Y. The stabilization zone 30 gradually thickens relative to the base curved surface 21 of the peripheral zone 20. Preferably, the thickness of the stabilization zone 30 may be progressively increased towards a thickness direction in linearly or nonlinearly manner, thereby, meniscus elevations (when viewed from the top in FIG. 2) located on left and right sides of the optical zone 10 are formed. The stabilization zone 30 includes an upper portion **30*a* and a lower portion 30*b*. The upper portion 30*a* extends upwards along a circumferential direction from the horizontal axis X, and the lower portion 30*b* extends downwards along the circumferential direction from the horizontal axis X. In the embodiment, the upper portion 30*a* and the lower portion 30*b* are mutually symmetrical relative to the horizontal axis X. In other possible embodiments, the upper portion 30*a* and the lower portion 30*b*** are not mutually symmetrical relative to the horizontal axis X.

The stabilization zone 30 includes a first elevation starting boundary 31, a second elevation starting boundary 32, a third elevation starting boundary 33, a fourth elevation starting boundary 34, the highest elevation zone 35 and a scale mark 36. The second elevation starting boundary 32 is defined between the upper portion **30*a* and the peripheral zone 20. The third elevation starting boundary 33 is defined between the lower portion 30*b* and the peripheral zone 20. The first elevation starting boundary 31 and the fourth elevation starting boundary 34 may be regarded as boundary lines. The second elevation starting boundary 32 and the third elevation starting boundary 33 may be regarded as boundary points. Two ends of the first elevation starting boundary 31 and the fourth elevation starting boundary 34 intersect at the second elevation starting boundary 32 and the third elevation starting boundary 33. In the embodiment, the highest elevation zone 35 is the highest elevation point located on the horizontal axis X. In other examples, the highest elevation zone 35 may be the highest elevation line or the highest elevation surface, which is not limited herein. The scale mark 36 is a groove located on the horizontal axis X and formed in the stabilization zone 30** for the convenience of the wearer to examine whether the contact lens is positioned normally.

From the above, the stabilization zone 30 extends towards the highest elevation zone 35 linearly or nonlinearly from the first elevation starting boundary 31, the second elevation starting boundary 32, the third elevation starting boundary 33 and the fourth elevation starting boundary 34 so as to form the meniscus elevations located on the left and right sides of the optical zone 10.

Further, the contact lens 1 has a height H from the lowest point to the highest point. A height h of the highest elevation zone 35 relative to the lowest point is located at a position between 0.52 times the height H and 0.63 times the height H (i.e., 0.52H to 0.63H). In an embodiment, the height h may range from 0.54H to 0.61H. In another embodiment, the height h may range from 0.56H to 0.59H. A thickness variation between the first elevation starting boundary 31 and the highest elevation zone 35 has a first slope. A thickness variation between the fourth elevation starting boundary 34 and the highest elevation zone 35 has a second slope. The first slope is smaller than the second slope. In a preferred embodiment, the first slope is smaller than 0.2, and the second slope is greater than 0.6. In an embodiment, the first slope may be between 0.01 and 0.2, and the second slope may be between 0.6 and 0.9. In another embodiment, the first slope may be between 0.01 and 0.1, and the second slope may be between 0.7 and 0.8.

A distance d1 from the first elevation starting boundary 31 to the geometric center O is between 2.5 mm and 3.5 mm (the distance d1 may be regarded as a geometric radius from the first elevation starting boundary 31 to the geometric center O). In an embodiment, the distance d1 may be between 2.7 mm and 3.3 mm. In another embodiment, the distance d1 may be between 2.9 mm and 3.1 mm A distance d2 from the highest elevation zone 35 to the geometric center O is between 5.5 mm and 6.25 mm. In an embodiment, the distance d2 may be between 5.65 mm and 6.1 mm. In another embodiment, the distance d2 may be between 5.8 mm and 5.95 mm.

An included angle $\theta_1$ is formed between a line connecting the second elevation starting boundary 32 and the geometric center O and the horizontal axis X. An included angle $\theta_2$ is formed between a line connecting the third elevation starting boundary 33 and the geometric center O and the horizontal axis X. In the embodiment, the stabilization zones 30 are symmetrically arranged relative to the vertical axis Y. The included angle $\theta_1$ is regarded as +75° towards the direction of the positive vertical axis Y from the horizontal axis X. The included angle $\theta_2$ is regarded as −75° towards the direction of the negative vertical axis Y from the horizontal axis X. In other words, the second elevation starting boundary 32 is located at an angle of +75° measured from the horizontal axis X, and the third elevation starting boundary 33 is located at an angle of −75° measured from the horizontal axis X. In an embodiment, the included angle $\theta_1$ may be +65°, and the included angle $\theta_2$ may be −65°. In another embodiment, the included angle $\theta_1$ may be +55°, and the included angle $\theta_2$ may be −55°.

Figure 4:
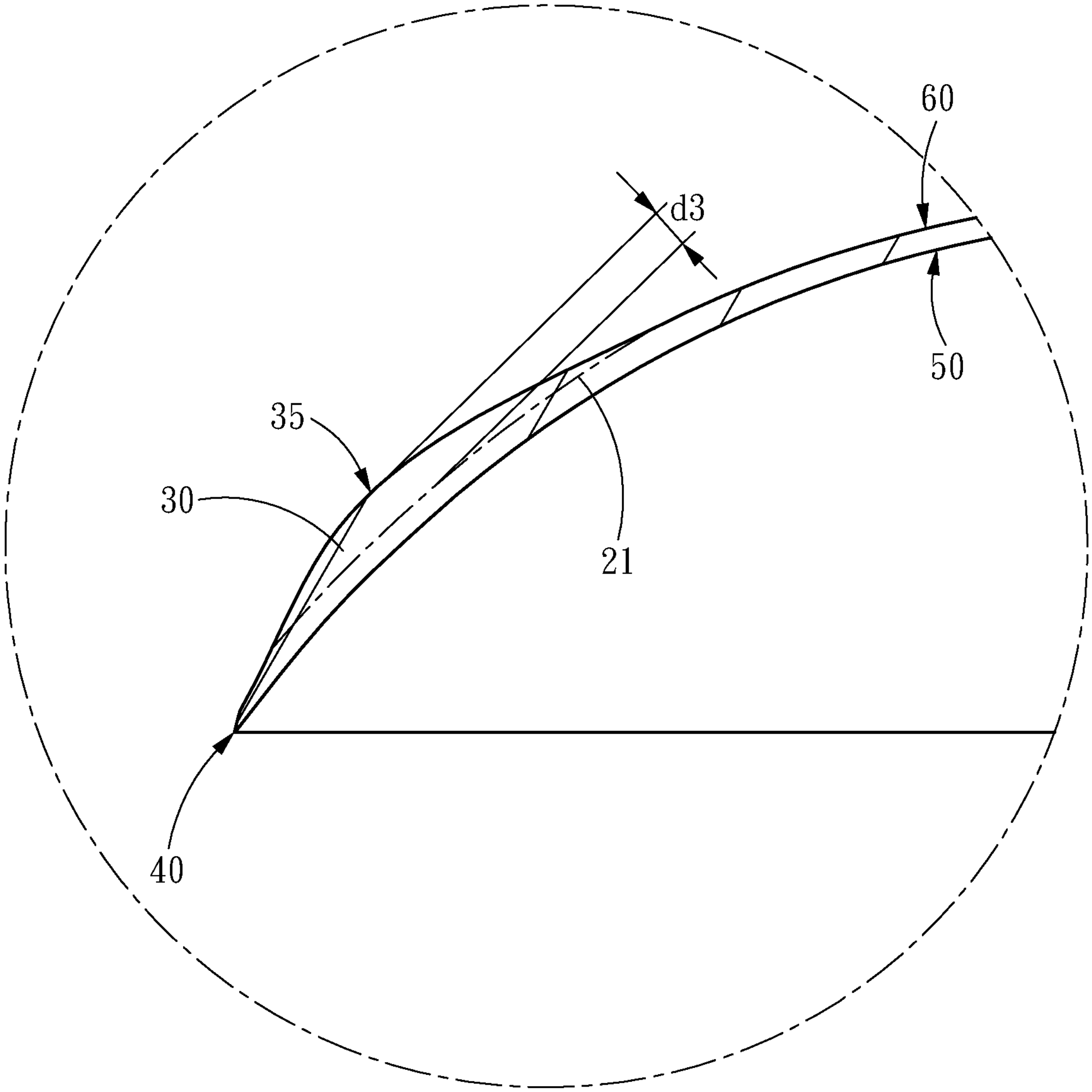
FIG. 4 is a partially enlarged schematic view of a portion B in FIG. 3.

Further referring to FIG. 4, FIG. 4 is a partially enlarged schematic diagram of a portion B in FIG. 3. Preferably, a distance d3 (height difference) between the highest elevation zone 35 of the stabilization zone 30 in a thickness direction and the base curved surface 21 of the peripheral zone 20 is between 0.15 mm and 0.35 mm. In an embodiment, the distance d3 may be between 0.2 mm and 0.3 mm. In another embodiment, the distance d3 may be between 0.23 mm and 0.27 mm.

Figure 5:
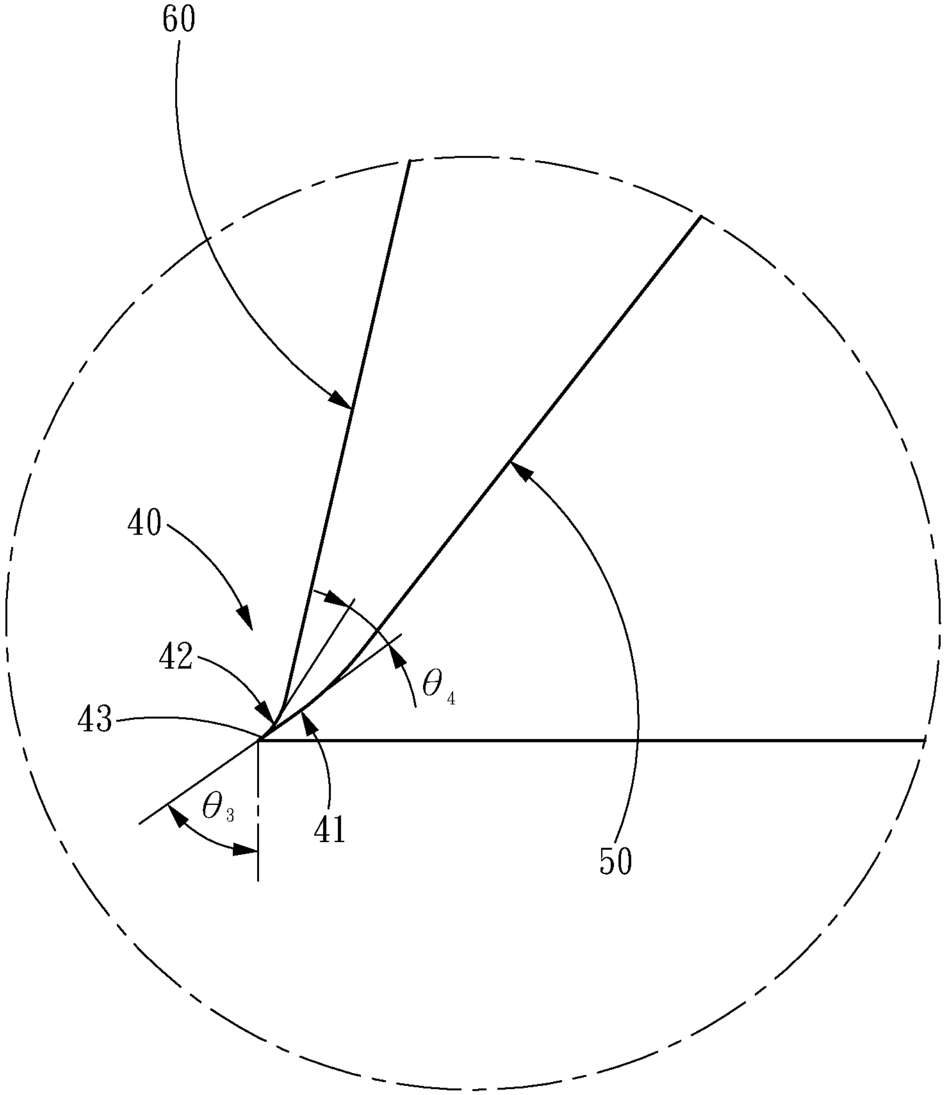
FIG. 5 is a partially enlarged schematic view of a portion C in FIG. 3.

Referring to FIG. 5, FIG. 5 is a partially enlarged schematic diagram of a portion C in FIG. 3. The edge zone 40 extends radially outwards from the peripheral zone 20 and surrounds the periphery of the contact lens 1. In other words, the edge zone 40 is located at the outermost periphery of the contact lens 1. In an example, a width of the edge zone 40 is between 0.2 mm and 2 mm.

The edge zone 40 is deviated from the base curved surface 21 of the peripheral zone 20 and bends towards the convex side 60. Further, the edge zone 40 has a first curved surface 41 and a second curved surface 42. The first curved surface 41 is located on the concave side 50 and the second curved surface 42 is located on the convex side 60. The first curved surface 41 and the second curved surface 42 extend outwards and intersect at a terminating edge 43, and an included angle $\theta_3$ of the terminating edge 43 relative to a longitudinal axis Z is between 53° and 65°. In an embodiment, the included angle $\theta_3$ may be between 56° and 62°. In another embodiment, the included angle $\theta_3$ may be between 58° and 60°. An included angle $\theta_4$ between the first curved surface 41 and the second curved surface 42 is between 9° and 15°. In an embodiment, the included angle $\theta_4$ may be between 10° and 14°. In another embodiment, the included angle $\theta_4$ may be between 11° and 13°. The included angle $\theta_4$ may be regarded as an included angle between any tangent line of the first curved surface 41 and any tangent line of the second curved surface 42. If the edge zone 40 is excessively bent, the user may be scratched, and an excessive amount of tear will enter a space between the contact lens 1 and the eyeball. If the edge zone 40 is inadequately bent, tear entering the space between the contact lens 1 and the eyeball will be inadequate for moisturizing. By means of the structural design where the edge zone 40 is bent outwards and the parameter conditions of the included angles $\theta_3$ and $\theta_4$, proper tear exchange may be provided to increase the comfort of the wearer wearing the contact lens.

In conclusion, by arranging the stabilization zones, the contact lens may be rapidly positioned and attached to the eyeball of the wearer, and is unlikely to slide. The stabilization zone seamlessly extends towards the highest elevation zone linearly or nonlinearly from the first elevation starting boundary, the second elevation starting boundary, the third elevation starting boundary and the fourth elevation starting boundary, so that foreign body sensation of the wearer wearing the contact lens may be reduced. In addition, by arranging the first curved surface and the second curved surface of the edge zone, the edge zone is deviated from the base curved surface of the peripheral zone and bends towards the convex side, so that the eyeball of the wearer may be prevented from being scratched by the edge zone of the contact lens, and exchange of tear may be facilitated to alleviate discomfort of the wearer and the foreign body sensation of the wearer wearing the contact lens.

What is claimed is:

1. A contact lens, comprising:

an optical zone for vision correction; and a peripheral zone surrounding the optical zone, the optical zone and the peripheral zone jointly defining a geometric center and a horizontal axis passing through the geometric center, wherein two stabilization zones symmetrically arranged relative to the geometric center are formed in the peripheral zone, and the stabilization zones gradually thicken relative to a base curved surface of the peripheral zone and meet the following conditions:

each of the stabilization zones comprises a first elevation starting boundary and a highest elevation zone in a radial direction relative to the geometric center, a distance from the first elevation starting boundary to the geometric center is between 2.5 mm and 3.5 mm, and a distance from the highest elevation zone to the geometric center is between 5.5 mm and 6.25 mm;

each of the stabilization zones comprises an upper portion extending upwards along a circumferential direction from the horizontal axis and a lower portion extending downwards along the circumferential direction from the horizontal axis, a second elevation starting boundary is defined between the upper portion and the peripheral zone, a third elevation starting boundary is defined between the lower portion and the peripheral zone, the second elevation starting boundary is located at an angle between +55° and +75° measured from the horizontal axis, and the third elevation starting boundary is located at an angle between −55° and −75° measured from the horizontal axis; and a height difference between the highest elevation zone of the stabilization zone in a thickness direction and the base curved surface of the peripheral zone is between 0.15 mm and 0.35 mm, and wherein the contact lens further comprises an edge zone extending radially outwards from the peripheral zone, wherein the edge zone is deviated from the base curved surface of the peripheral zone and bends towards a convex side of the contact lens, the edge zone has a first curved surface located on a concave side of the contact lens and a second curved surface located on the convex side, the first curved surface and the second curved surface extend outwards and intersect at a terminating edge, and an included angle of the terminating edge relative to a longitudinal axis is between 53° and 65°.

2. The contact lens according to claim 1, wherein the stabilization zone further comprises a fourth elevation starting boundary relative to the first elevation starting boundary, and a first slope of a thickness variation of the stabilization zone from the first elevation starting boundary to the highest elevation zone is smaller than a second slope of a thickness variation of the stabilization zone from the fourth elevation starting boundary to the highest elevation zone.

3. The contact lens according to claim 2, wherein the first slope is smaller than 0.2.

4. The contact lens according to claim 2, wherein the second slope is greater than 0.6.

5. The contact lens according to claim 1, wherein a height of the contact lens from a lowest point to a highest point is H, and a position of a height of the highest elevation zone relative to the lowest point is located between 0.52H and 0.63H.

6. The contact lens according to claim 1, wherein the upper portion and the lower portion of the stabilization zone are mutually symmetrical relative to the horizontal axis.

7. The contact lens according to claim 1, wherein an included angle between the first curved surface and the second curved surface is between 9° and 15°.

8. A contact lens, comprising:

an optical zone for vision correction; and a peripheral zone surrounding the optical zone, the optical zone and the peripheral zone jointly defining a geometric center and a horizontal axis passing through the geometric center, wherein two stabilization zones symmetrically arranged relative to the geometric center are formed in the peripheral zone, and the stabilization zones gradually thicken relative to a base curved surface of the peripheral zone and meet the following conditions:

each of the stabilization zones comprises a first elevation starting boundary and a highest elevation zone in a radial direction relative to the geometric center, a distance from the first elevation starting boundary to the geometric center is between 2.5 mm and 3.5 mm, and a distance from the highest elevation zone to the geometric center is between 5.5 mm and 6.25 mm;

each of the stabilization zones further comprises a fourth elevation starting boundary relative to the first elevation starting boundary, and a first slope of a thickness variation of the stabilization zone from the first elevation starting boundary to the highest elevation zone is smaller than 0.2, and a second slope of a thickness variation of the stabilization zone from the fourth elevation starting boundary to the highest elevation zone is greater than 0.6;

each of the stabilization zones comprises an upper portion extending upwards along a circumferential direction from the horizontal axis and a lower portion extending downwards along the circumferential direction from the horizontal axis, and the upper portion and the lower portion are mutually symmetrical relative to the horizontal axis; and a height difference between the highest elevation zone of the stabilization zone in a thickness direction and the base curved surface of the peripheral zone is between 0.15 mm and 0.35 mm, and wherein the contact lens further comprises an edge zone extending radially outwards from the peripheral zone, wherein the edge zone is deviated from the base curved surface of the peripheral zone and bends towards a convex side of the contact lens, the edge zone has a first curved surface located on a concave side of the contact lens and a second curved surface located on the convex side, the first curved surface and the second curved surface extend outwards and intersect at a terminating edge, and an included angle of the terminating edge relative to a longitudinal axis is between 53° and 65°.

9. The contact lens according to claim 8, wherein a second elevation starting boundary is defined between the upper portion and the peripheral zone, a third elevation starting boundary is defined between the lower portion and the peripheral zone, the second elevation starting boundary is located at an angle between +55° and +75° measured from the horizontal axis, and the third elevation starting boundary is located at an angle between −55° and −75° measured from the horizontal axis.

10. The contact lens according to claim 8, wherein a height of the contact lens from a lowest point to a highest point is H, and a position of a height of the highest elevation zone relative to the lowest point is located between 0.52H and 0.63H.

11. The contact lens according to claim 8, wherein an included angle between the first curved surface and the second curved surface is between 9° and 15°.

* * * * *